(12) United States Patent
Yoshinaga

(10) Patent No.: US 12,103,774 B2
(45) Date of Patent: Oct. 1, 2024

(54) ARTICLE TRANSPORT VEHICLE

(71) Applicant: Daifuku Co., Ltd., Osaka (JP)

(72) Inventor: Kazuharu Yoshinaga, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 864 days.

(21) Appl. No.: 17/255,598

(22) PCT Filed: Jun. 13, 2019

(86) PCT No.: PCT/JP2019/023480
§ 371 (c)(1),
(2) Date: Dec. 23, 2020

(87) PCT Pub. No.: WO2020/004059
PCT Pub. Date: Jan. 2, 2020

(65) Prior Publication Data
US 2021/0276802 A1    Sep. 9, 2021

(30) Foreign Application Priority Data

Jun. 26, 2018  (JP) .................................. 2018-120941

(51) Int. Cl.
*G06K 7/14* (2006.01)
*B65G 1/04* (2006.01)
*B65G 1/137* (2006.01)

(52) U.S. Cl.
CPC ......... *B65G 1/1371* (2013.01); *B65G 1/0492* (2013.01); *B65G 2203/0216* (2013.01)

(58) Field of Classification Search
CPC ................ B65G 1/1371; B65G 1/0492; B65G 2203/0216; B65G 1/1375; G06K 7/14; G06K 19/06009
See application file for complete search history.

(56) References Cited

U.S. PATENT DOCUMENTS 10,198,706 B2 *  2/2019  Johnson ............. G06K 7/10366
10,354,214 B2 *  7/2019  Johnson ............. G06K 7/10297
(Continued)

FOREIGN PATENT DOCUMENTS

JP    2000142928 A    5/2000
JP    2002187605 A    7/2002
(Continued)

*Primary Examiner* — Patrick H Mackey
(74) *Attorney, Agent, or Firm* — The Webb Law Firm

(57) ABSTRACT

Provided is technology that identifies a worker who took an article out from a storage portion when retrieving articles from a plurality of storage portions for storing articles using an article transport vehicle. Provided is a control unit (15); a support portion (12) that supports an article (B) taken out from a storage portion (1) for storing an article (B) and placed through a placement opening (K) by a worker; a placement detecting unit (5) that detects placement of an article (B) through the placement opening (K); and an identification information reading unit (4) that reads identification information indicative of information of the worker (M), wherein the identification information reading unit (4) reads the identification information when the placement detecting unit (5) detects placement of an article (B), and the control unit (15) associates the identification information and placement history of an article (B) and stores the placement history in a storage unit.

6 Claims, 9 Drawing Sheets

(56) References Cited

U.S. PATENT DOCUMENTS

| | | | |
|---|---|---|---|
| 10,579,949 B2* | 3/2020 | Khatravath | G06Q 10/08 |
| 10,769,579 B1* | 9/2020 | Smith | B65G 1/1375 |
| 10,949,804 B2* | 3/2021 | Gopalakrishnan | G06Q 10/0875 |
| 10,984,372 B2* | 4/2021 | Gopalakrishnan | G06Q 10/087 |
| 11,000,953 B2* | 5/2021 | Johnson | G06V 40/172 |
| 2005/0216119 A1* | 9/2005 | Hamilton | G07G 1/009 700/224 |
| 2015/0073589 A1 | 3/2015 | Khodl et al. | |
| 2017/0029213 A1* | 2/2017 | Johnson | B25J 11/008 |
| 2017/0029214 A1* | 2/2017 | Johnson | G06V 40/18 |

FOREIGN PATENT DOCUMENTS

| | | |
|---|---|---|
| JP | 2003104520 A | 4/2003 |
| JP | 2003128215 A | 5/2003 |
| JP | 2008247546 A | 10/2008 |
| JP | 2009137748 A | 6/2009 |
| JP | 2010078951 A | 4/2010 |
| JP | 2014031262 A | 2/2014 |
| JP | 2015168546 A | 9/2015 |
| WO | 2015035300 A1 | 3/2015 |

* cited by examiner

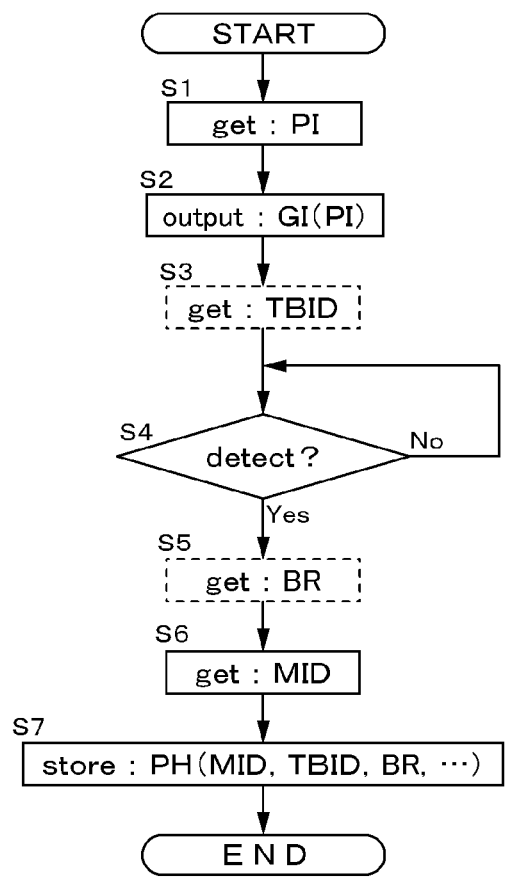

ARTICLE TRANSPORT VEHICLE

CROSS-REFERENCE TO RELATED APPLICATIONS

This application is the United States national phase of International Application No. PCT/JP2019/023480 filed Jun. 13, 2019, and claims priority to Japanese Patent Application No. 2018-120941 filed Jun. 26, 2018, the disclosures of which are hereby incorporated by reference in their entirety.

BACKGROUND OF THE INVENTION

Field of the Invention

The present invention relates to an article transport vehicle for retrieving articles from a plurality of storage portions for storing articles.

Description of Related Art

A picking facility described in JP 2008-247546 (Patent Document 1) is provided with a picking cart (1) for moving an article picked from a storage shelf (3) to containers for different stores or other sorting destinations (the reference numbers in parentheses are referenced from the Background Art). In this facility, the worker pushes the picking cart (1) and moves the picking cart (1) following the storage shelf (3) including a plurality of storage portions (5) in which different items are stored. Also, an article is taken out from one of the storage portions (5) on the basis of a designation from a terminal (21) provided on the picking cart (1) and the article is stored in a container (8) of the picking cart (1). A container (8) is provided for each sorting destination, allowing articles to be retrieved for each sorting destination.

When retrieving articles, a picking error where the wrong article is taken out from a storage portion by the worker may occur. In such cases, feedback is preferably appropriately given to the worker that a picking error occurred to prevent another occurrence. For this, the worker that performed picking is preferably easily identified. However, to identify a worker during picking adds work to the process, and as such is not preferable. In other words, it is preferable to identify a picking worker without increasing the work involved in the picking process.

Patent Document 1: JP 2008-247546A

SUMMARY OF THE INVENTION

In light of the background described above, there is a demand for a technology that, without increasing work, appropriately identifies a worker who took an article out from a storage portion when retrieving articles from a plurality of storage portions for storing articles using an article transport vehicle.

An article transport vehicle according to one aspect includes:
- a travel portion that travels to set positions set corresponding to a plurality of storage portions for storing articles;
- a control unit that controls the travel portion;
- a support portion that supports an article taken out from one of the plurality of storage portions and placed through a placement opening by a worker;
- a placement detecting unit that detects placement of an article through the placement opening; and
- an identification information reading unit that reads identification information indicative of information of the worker, wherein
- the identification information reading unit reads the identification information when the placement detecting unit detects placement of an article, and
- the control unit further associates the identification information and placement history of an article and stores the placement history in a storage unit.

According to this configuration, when the placement detecting unit detects placement of an article through the placement opening, the identification information reading unit reads the identification information indicative of the information of the worker. Thus, the worker does not have to performing any special operations or task to have the identification information read, helping prevent a decrease in work efficiency. Also, the placement history of an article is associated with the identification information and stored in the storage unit. Thus, the worker who took out an article from a storage portion and placed it through the placement opening can be appropriately recorded. In this way, this configuration can, without increasing work, appropriately identify a worker who took an article out from a storage portion when retrieving articles from a plurality of storage portions for storing articles using an article transport vehicle.

Advantages of the article transport vehicle will be made clear from the embodiments described below with reference to the drawings.

BRIEF DESCRIPTION OF THE DRAWINGS

FIG. 10 is a flowchart illustrating an example of storing identification information of a worker.

DETAILED DESCRIPTION OF PREFERRED EMBODIMENTS

Figure 1:
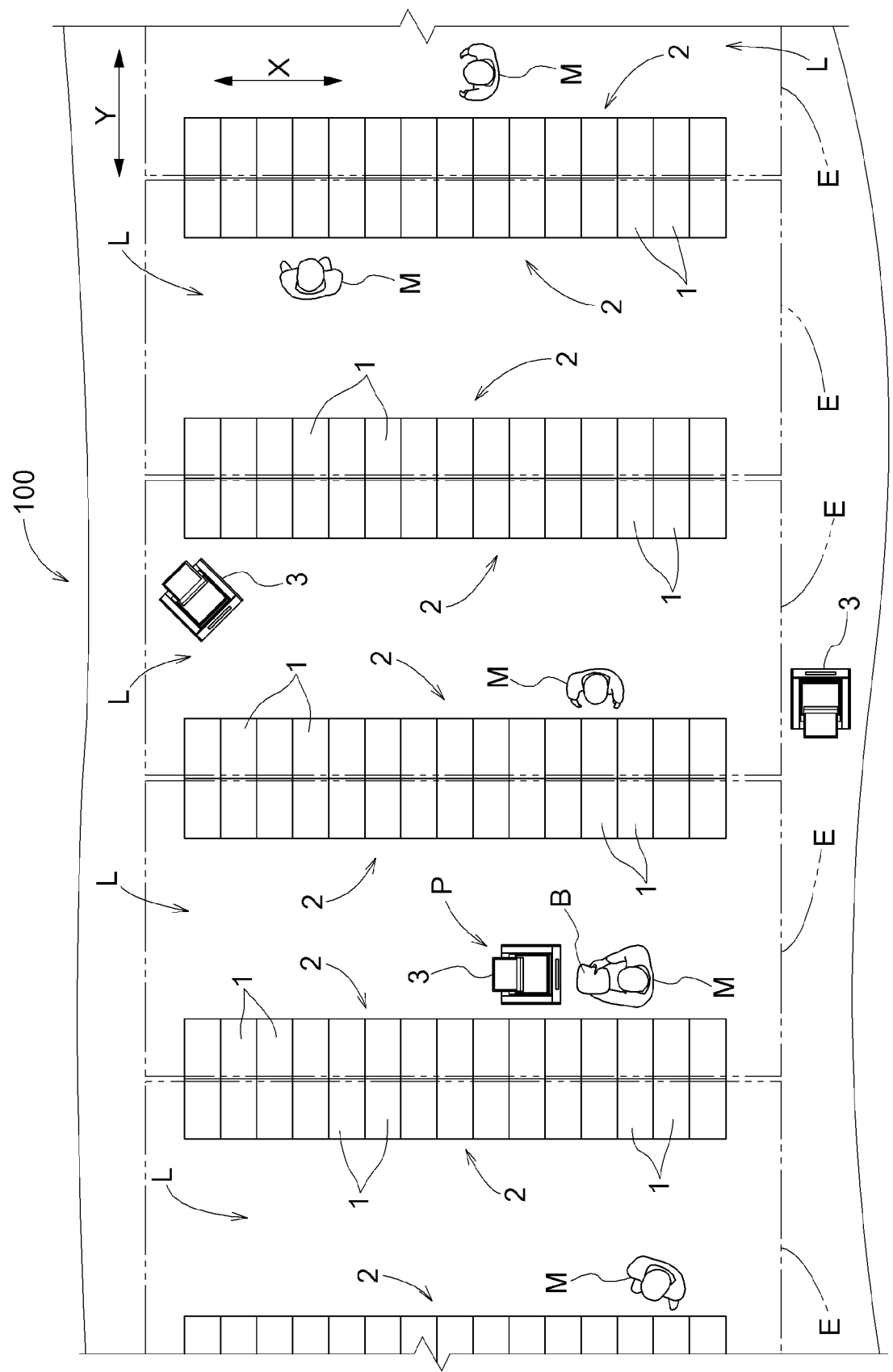
FIG. 1 is a plan view of a picking facility.
Figure 2:
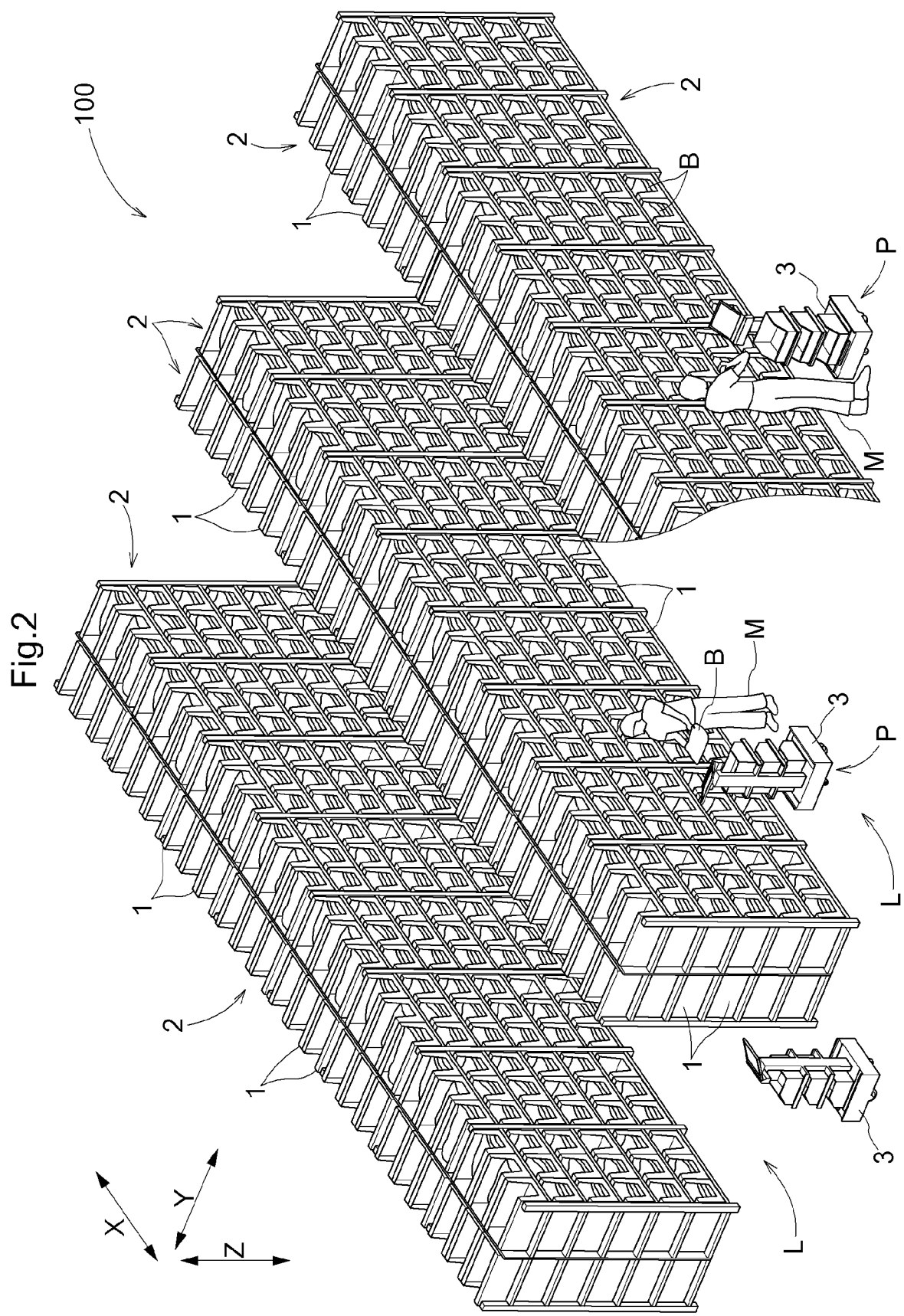
FIG. 2 is a perspective view of a picking facility.
Figure 3:
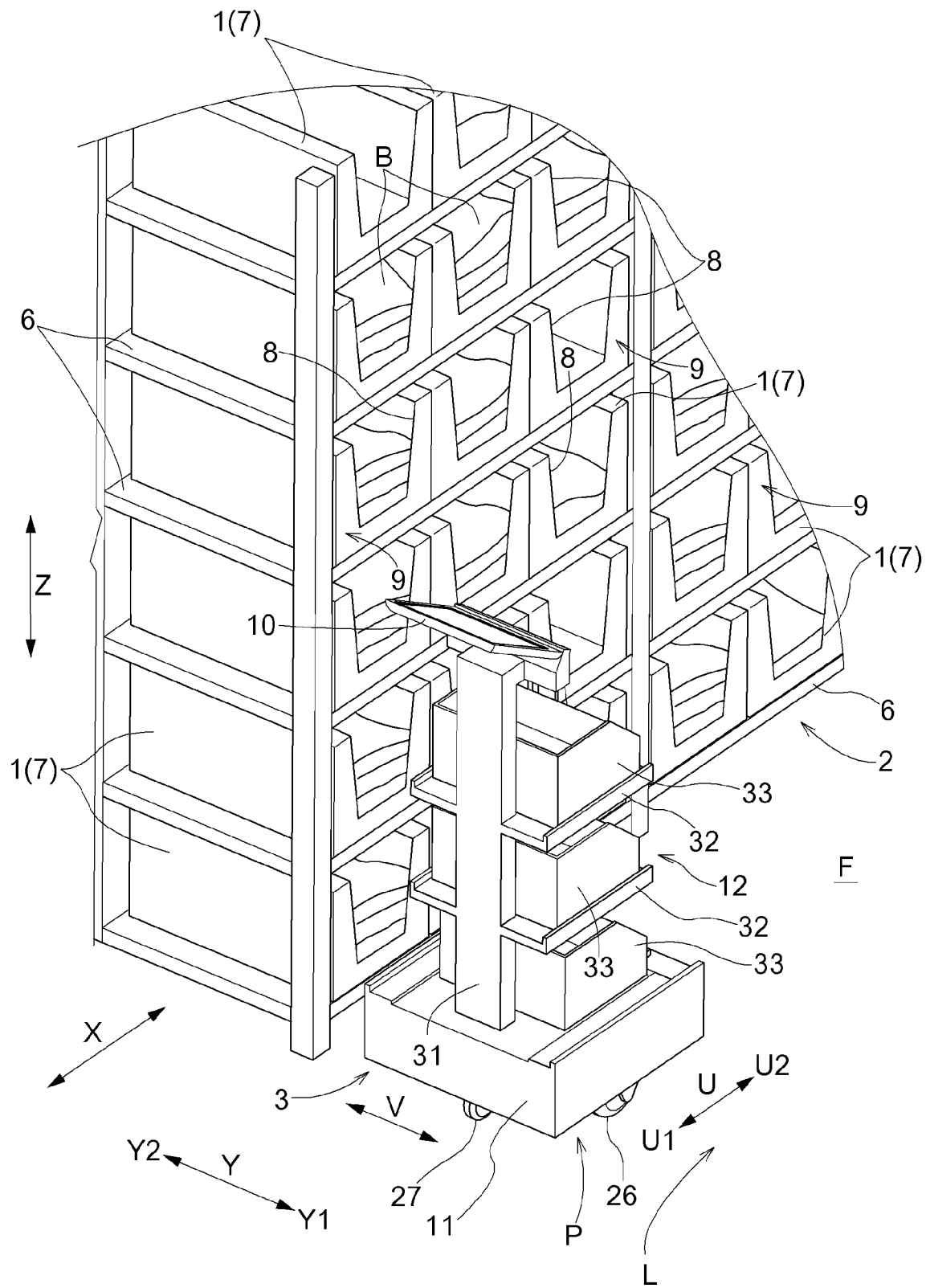
FIG. 3 is an enlarged perspective view of a picking facility and an article transport vehicle.
Figure 4:
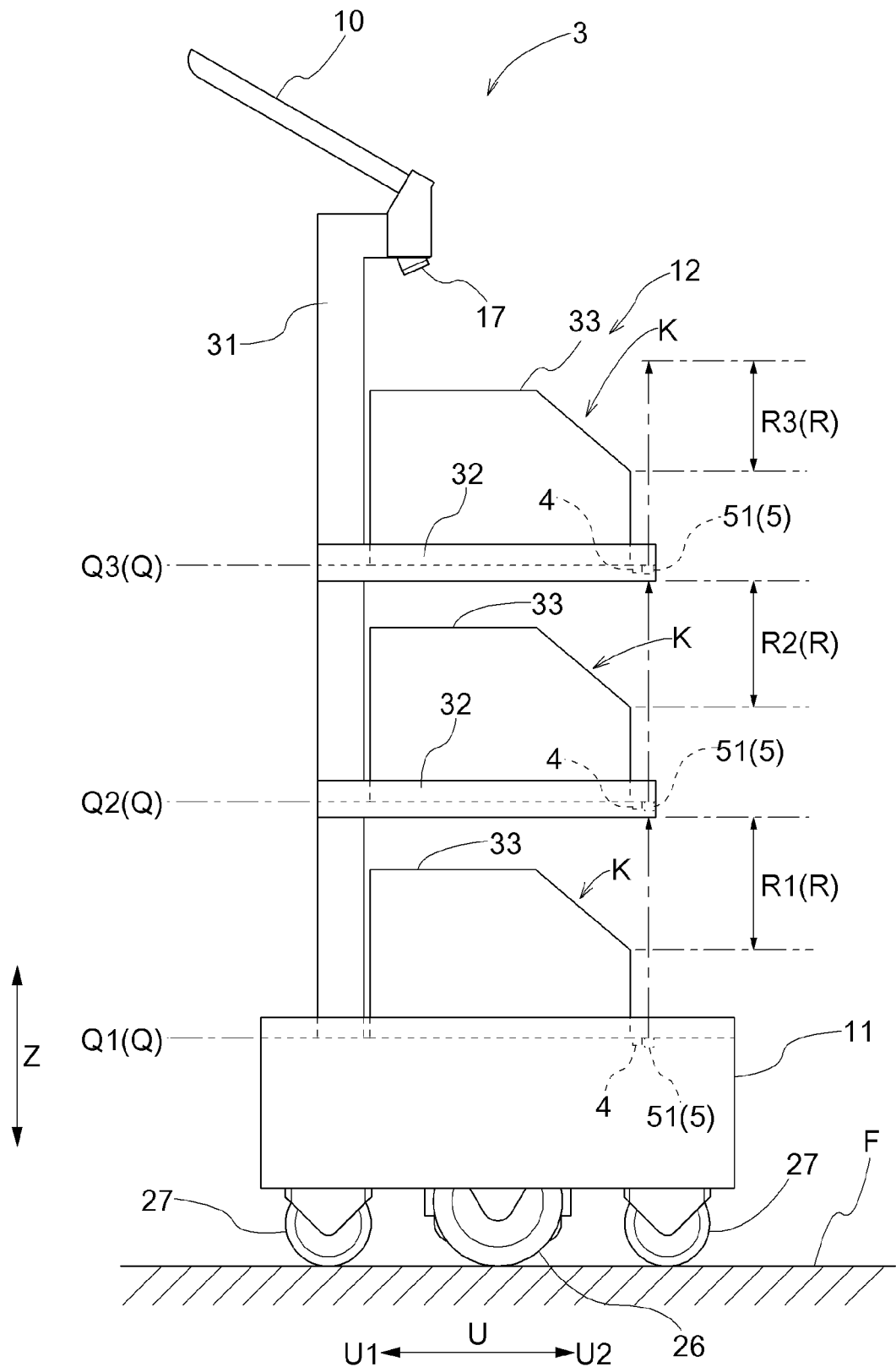
FIG. 4 is a side view of an article transport vehicle according to an example of detection by a placement detecting unit.
Figure 5:
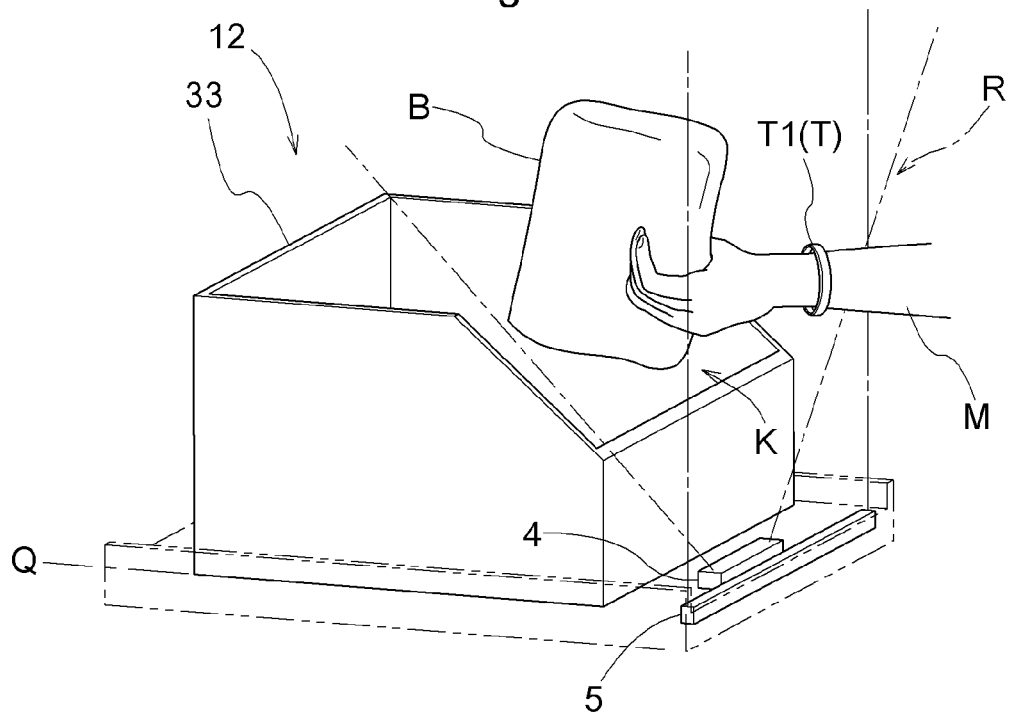
FIG. 5 is a perspective view of a support portion.

Embodiments of an article transport vehicle used in a picking facility will be described with reference to the drawings. FIG. 1 is a plan view of a picking facility 100 as seen from vertically above in a vertical direction Z. FIG. 2 is a perspective view of the picking facility 100 as seen from diagonally above. FIG. 3 is an enlarged perspective view of the picking facility 100 and an article transport vehicle 3. FIG. 4 is a side view of the article transport vehicle 3. FIG. 5 is a perspective view of a transport container 33 of the article transport vehicle 3 when a worker M places an article B in a placement opening K at a single support position Q. The picking facility 100 is provided with an article storage shelf 2, that includes a plurality of storage portions 1 for storing articles B, and the article transport vehicle 3 that travels on a floor F. Also, as described below with reference to a control block diagram of FIG. 6, the picking facility 100 is also provided with a control device H that manages the articles B stored in the article storage shelf 2 and the article transport vehicle 3. As illustrated in FIGS. 1 and 2, in the picking facility 100, the workers M work in cooperation with the article transport vehicle 3 to pick the articles B for each sorting destination from the plurality of storage portions 1.

In the description of the storage portions 1 and the article storage shelf 2 below, the direction in which the storage portions 1 of the article storage shelf 2 are arranged side by side as seen in the vertical direction is referred to as a first direction X (arrangement direction), and the direction orthogonal to the first direction X in the horizontal plane is referred to as a second direction Y. Also, to describe the relationship between the storage portions 1, the direction along the second direction Y from the storage portions 1 toward an aisle L is referred to as an aisle side Y1, and the direction along the second direction Y from the aisle L toward the storage portions 1 is referred to as a storage portion side Y2. With regards to the article transport vehicle 3, the direction the article transport vehicle 3 advances when travelling straight is referred to as a front-and-rear direction U, and the direction orthogonal to the front-and-rear direction U in the horizontal plane is referred to as a width direction V. For the front-and-rear direction U, the side toward which the article transport vehicle 3 advances when travelling straight is referred to as a front side U1, and the opposite side is referred to as a rear side U2.

The article storage shelf 2 is provided with the plurality of storage portions 1 arranged side by side in the vertical direction Z and the first direction X. Specifically, the article storage shelf 2 is provided with a plurality of shelves 6 that divide the article storage shelf 2 into intervals in the vertical direction Z. A plurality of storage containers 7 are placed on each of the shelves 6 arranged side by side in the first direction X. In other words, the storage portions 1 are formed by the storage containers 7 provided on the article storage shelf 2. On the article storage shelf 2, various types of articles are stored by type, and one type of article is stored in one storage portion 1 (storage container 7).

As illustrated in FIG. 3, the storage containers 7, i.e., the storage portions 1, are each provided with an opening surface 9 that includes an opening portion 8 through which the article B is put in and taken out. The storage containers 7 are placed in the article storage shelf 2 with the opening surface 9 facing the aisle side Y1. The plurality of storage portions 1 in a single article storage shelf 2 are arranged with the opening surfaces 9 facing the same direction.

As illustrated in FIG. 1, the area where the article storage shelves 2 are installed is divided into a plurality of areas E. Preferably, a worker M is stationed in charge of each area E. In the area E the worker M is in charge of, the worker M picks the article B from the article storage shelf 2 and transfers the article B to the article transport vehicle 3. Also, the worker M may replenish inventory by transferring the article B from the article transport vehicle 3 to the article storage shelf 2. Note that the relationship between the number of areas E and the number of workers M may be changed in a discretionary manner, and, for example, a plurality of workers M may be stationed in a single area E or a single worker M may be in charge of a plurality of areas E.

The control device H manages the sorting of the articles B stored in the storage portions 1, the quantity in stock, and the like. The control device H, for example, transmits picking information to a control unit 15 of the article transport vehicle 3 when a picking command to retrieve the articles B from the article storage shelf 2 for each sorting destination is output from a higher-level controller. The picking information may be information indicative of the position of the storage portion 1 from which the worker M can pick and take out the article B and/or information indicative of the type and/or number of articles B to take out from the storage portion 1.

As illustrated in FIG. 4, the article transport vehicle 3 includes a travel portion 11 that travels on the floor F, a support portion 12 that supports the article B, a notification unit 10 that notifies the worker M of picking information, and the control unit 15 that controls at least the travel portion 11. Also, the article transport vehicle 3 includes an ID reader 4 (an identification information reading unit) that reads identification information (worker identification information MID (see FIG. 10)) indicative of information of the worker M, a barcode reader 17 that reads a barcode (article identification information TBID (see FIG. 10)) displayed on the article B, and a placement detecting unit 5 that detects the placement of the article B through the placement opening K described below (see FIGS. 4 and 5).

As illustrated in FIGS. 3 and 4, the travel portion 11 includes a pair of travel wheels 26 disposed side by side in the width direction V, driven wheels 27 disposed on both sides in the front-and-rear direction U with respect to the arrangement direction of the pair of travel wheels 26, and a travel motor 28 (see FIG. 6) that rotationally drives the travel wheels 26. The travel portion 11 travels forward by the travel motor 28 rotating the pair of travel wheels 26 in the forward direction and travels backward by the travel motor 28 rotating the pair of travel wheels 26 in the reverse direction. Also, the travel portion 11 corners by the travel motor 28 rotating the pair of travel wheels 26 at different rotation speeds. Note that rotating at different rotation speeds includes in its meaning the pair of travel wheels 26 rotating in different direction and one travel wheel 26 being driven while the other travel wheel 26 is stopped.

Also, a supporting column 31 is disposed vertically on the travel portion 11. A plurality of support bases 32 (in this embodiment, two support bases 32) are supported by the supporting column 31. Also, the notification unit 10 is supported on an upper end of the supporting column 31. The transport containers 33 are supported on an upper surface of the travel portion 11 and the two support bases 32. As illustrated in FIGS. 3 and 5, the transport containers 33 are each provided with an opening portion. The opening portion corresponds to the placement opening K through which the article B taken out from the storage portion 1 by the worker M is placed in the transport container 33.

In this embodiment, the article transport vehicle 3 is provided with three transport containers 33, and an assembly of these transport containers 33 corresponds to the support portion 12 of a single article transport vehicle 3, the support portion 12 supporting the article B taken out from the storage portion by the worker M and placed through the placement opening K. Also, an assembly of the placement openings K of the transport containers 33 corresponds to the placement opening K of the support portion 12. In other words, as illustrated in FIG. 4, the support portion 12 is provided with a plurality of support positions Q (a first support position Q1, a second support position Q2, and a third support position Q3 illustrated in FIGS. 4 and 8), and the placement opening K includes a plurality of placement regions R (a first placement region R1, a second placement region R2, and a third placement region R3) corresponding to the plurality of support positions Q.

The notification unit 10 is provided with a display unit 14. The display unit 14 is disposed with a display screen facing the rear side U2 and upward. At least a piece of picking information PI is displayed on the display unit 14. Information displayed on the display unit 14 includes, for example, the category or number to take out of the target article, i.e., the article B to be taken out from the storage portion 1; the target storage portion, i.e., the storage portion 1 from where the target article is taken out; the target support portion, i.e., the support portion 12 to support the target article; and the like. Also, the display unit 14 preferably includes a touch panel that allows the worker M to operate via the displayed touch panel. In this embodiment, the notification unit 10 is provided with the display unit 14. However, the notification unit 10 may not be provided with the display unit 14, and, in other embodiment, the notification unit 10 may provide the picking information PI via audio or the like.

Figure 7:
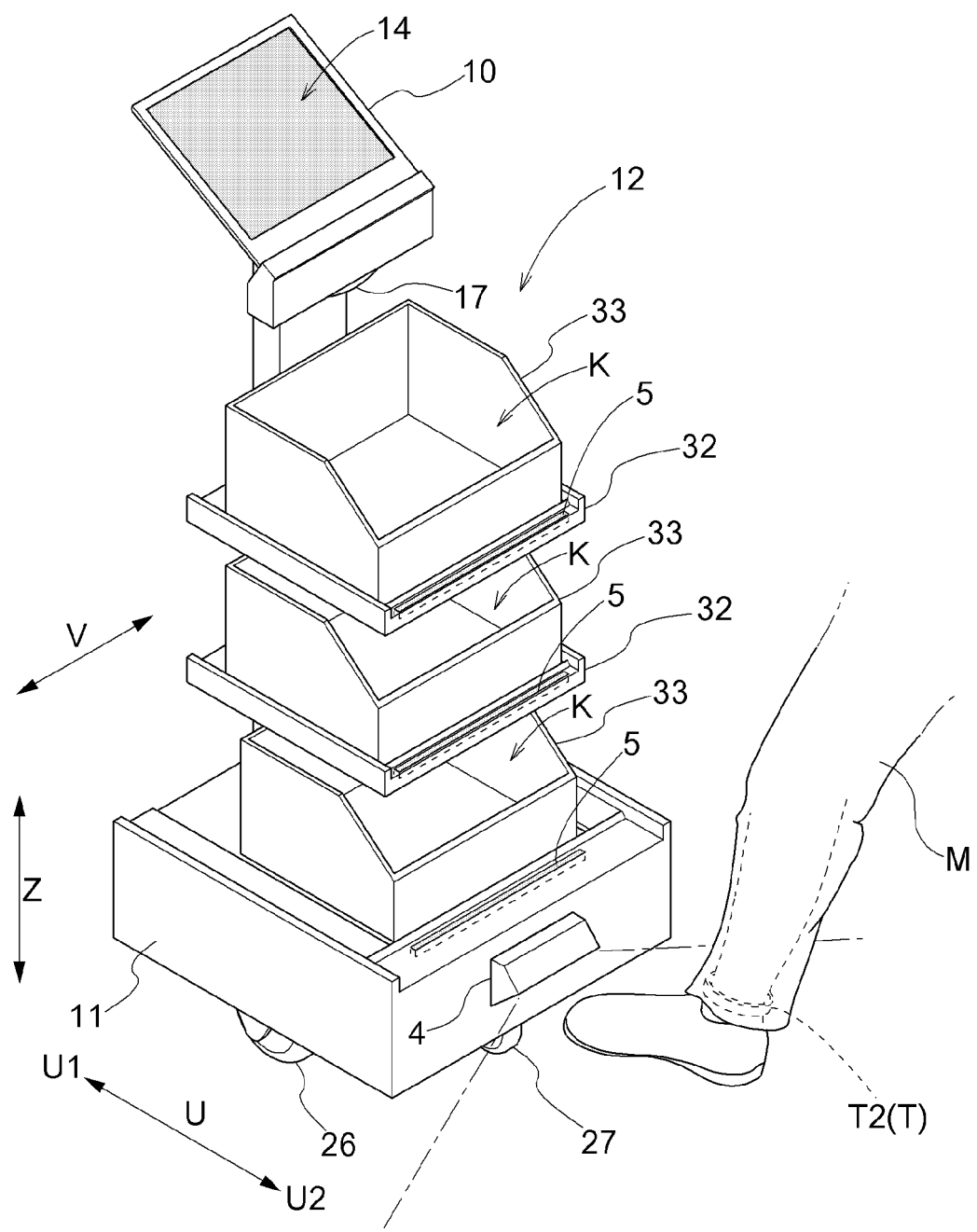
FIG. 7 is a perspective view of an article transport vehicle.

As illustrated in FIG. 5, the worker identification information MID is attached to an identification information carrier T that is worn on the wrist of the worker M. The worker identification information MID is a worker number allocated to each worker M, for example. In the example illustrated in FIG. 5, the identification information carrier T is a bracelet-type IC tag T1 worn on the wrist of the worker M. However, the identification information carrier T may be a ring-type IC tag worn on a finger of the worker M, an IC tag attached to the gloves of the worker M, or the like. Also, in the example illustrated in FIG. 7, the identification information carrier T may be an anklet-type IC tag T2 worn on the ankle of the worker M. Alternatively, the identification information carrier T may be an IC tag chip provided in a portion, such as the toe, of a shoe of the worker M.

In this way, the identification information carrier T may be a wireless tag (for example, an RFID tag) capable of communicating with the ID reader 4 wirelessly, and the ID reader 4 may be an RFID reader. The wireless tag is preferably a passive tag, as the worker M in possession of the tag does not need to worry about powering the tag. Also, in cases in which a wide communicable range is necessary or the like, the wireless tag is preferably an active tag provided with a power source.

Note that the identification information carrier T and the ID reader 4 are not limited to wireless communication embodiments. For example, in another embodiment, a one-dimensional or two-dimensional barcode may be displayed on the back of the hand (back side of the glove) of the worker M, and the barcode may read the worker identification information MID in the barcode. In this case, the one-dimensional or two-dimensional barcode corresponds to the identification information carrier T, and the barcode reader corresponds to the ID reader 4. This barcode reader may also function as the barcode reader 17 that reads the barcode (article identification information TBID) displayed on the article B or may be a separate barcode reader.

The placement detecting unit 5 that detects the placement of the article B through the placement opening K includes a light curtain, for example. The light curtain is provided with a light projecting unit that projects a plurality of light beams in a direction aligned with the vertical direction Z at a position between the placement opening K and the worker M and a light receiving unit that receives the projected light beams or the light beams reflected by a detection target. The light curtain detects the article B being placed through the placement opening K by the light beams being blocked by the detection target (the worker M or the article B as illustrated in FIG. 5).

Figure 8:
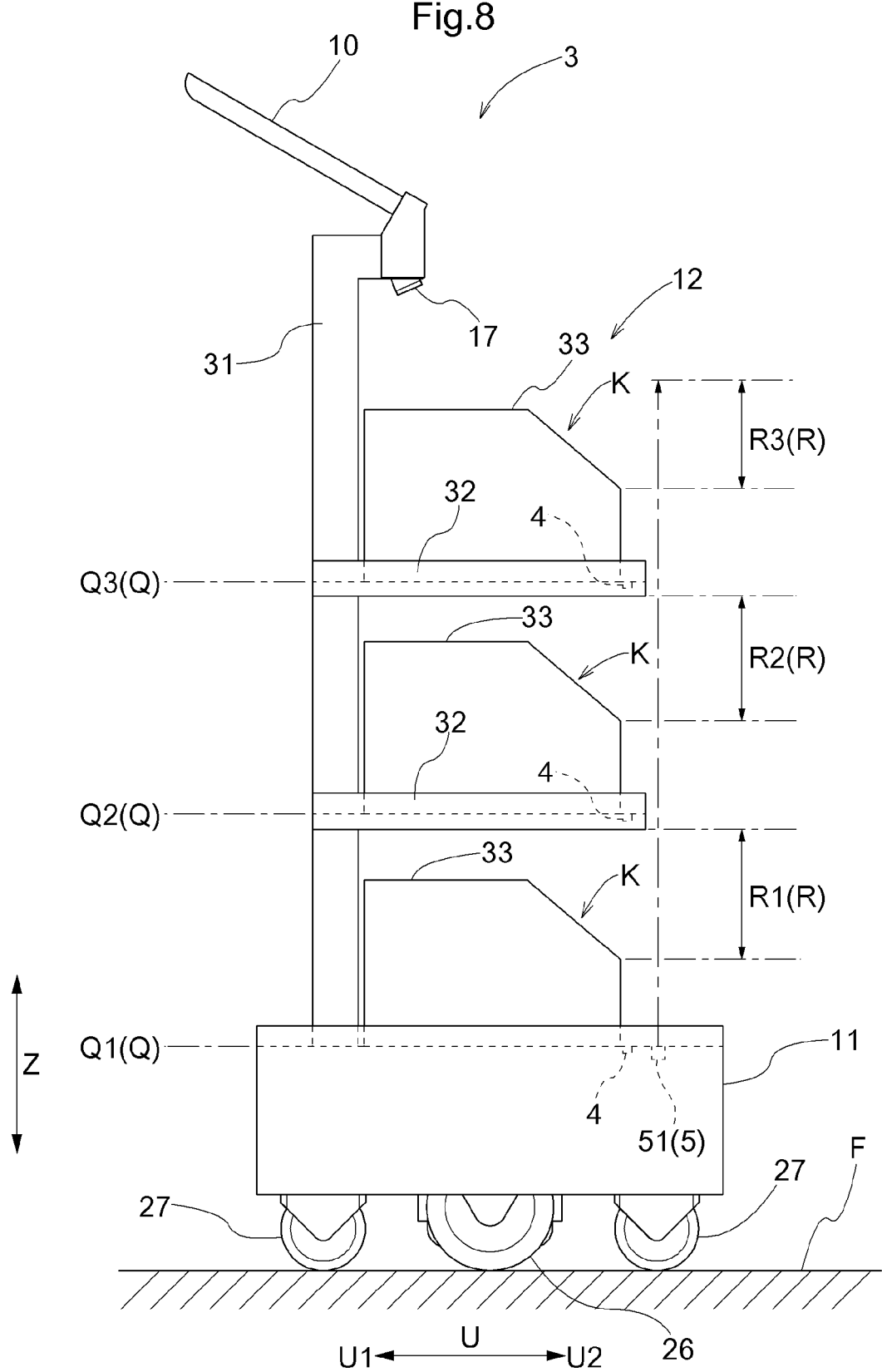
FIG. 8 is a side view of an article transport vehicle according to another example of detection by a placement detecting unit.

Note that in the embodiments illustrated in FIGS. 4, 5, and 8, the worker M places the article B through the placement opening K from the rear side U2 of the article transport vehicle 3. However, the direction in which the article B is placed is not limited by this embodiment. The article B may be placed through the placement opening K from the width direction V. Even in this case, if the worker M is located on the rear side U2 of the article transport vehicle 3, the placement detecting unit 5 disposed on the rear side U2 of the article transport vehicle 3 as in the examples illustrated in FIGS. 4, 5, and 8 can detect the placement of the article B through the placement opening K.

Also, the placement detecting unit 5 may be disposed on the rear side U2 of the transport container 33 and both sides in the width direction V of the transport container 33. In a similar manner, in the embodiments illustrated in FIGS. 4, 5, and 8, the ID reader 4 is also disposed on the rear side U2 of the transport container 33. However, the ID reader 4 may be disposed on the rear side U2 of the transport container 33 and both sides in the width direction V of the transport container 33. Also, in the illustrated embodiment, the light beams are projected in the vertical direction Z. However, in another embodiment, the light beams may be projected in a shape that conforms to the shape of the placement opening K. Also, in the illustrated embodiment, the placement detecting unit 5 includes a light curtain. However, the placement detecting unit 5 may include an ultrasonic sensor, an electrostatic sensor, a camera, or another type of sensor.

The ID reader 4 reads the worker identification information MID when the placement detecting unit 5 detects the article B being placed. As illustrated in FIG. 3, in the case in which the identification information carrier is the bracelet-type IC tag T1 worn on the wrist of the worker M, when the hand of the worker M holding the article B approaches the placement opening K, the bracelet-type IC tag T1 enters a detection region of the ID reader 4. Accordingly, the worker identification information MID can be read while the task of placing the article B through the placement opening K is performed, without requiring an operation or task of having the worker identification information MID be read.

In this way, the placement detecting unit 5 detecting the article B being placed through the placement opening K and the ID reader 4 detecting the worker identification information MID can be consolidated into a single operation (task) by the worker M. The control unit 15 associates the worker identification information MID to placement history PH (see FIG. 10) of the article B and stores the placement history PH in a storage unit 40. Preferably, the placement history PH also includes information of the article B (the picking information PI, the article identification information TBID, and the like) other than just the worker identification information MID.

Figure 6:
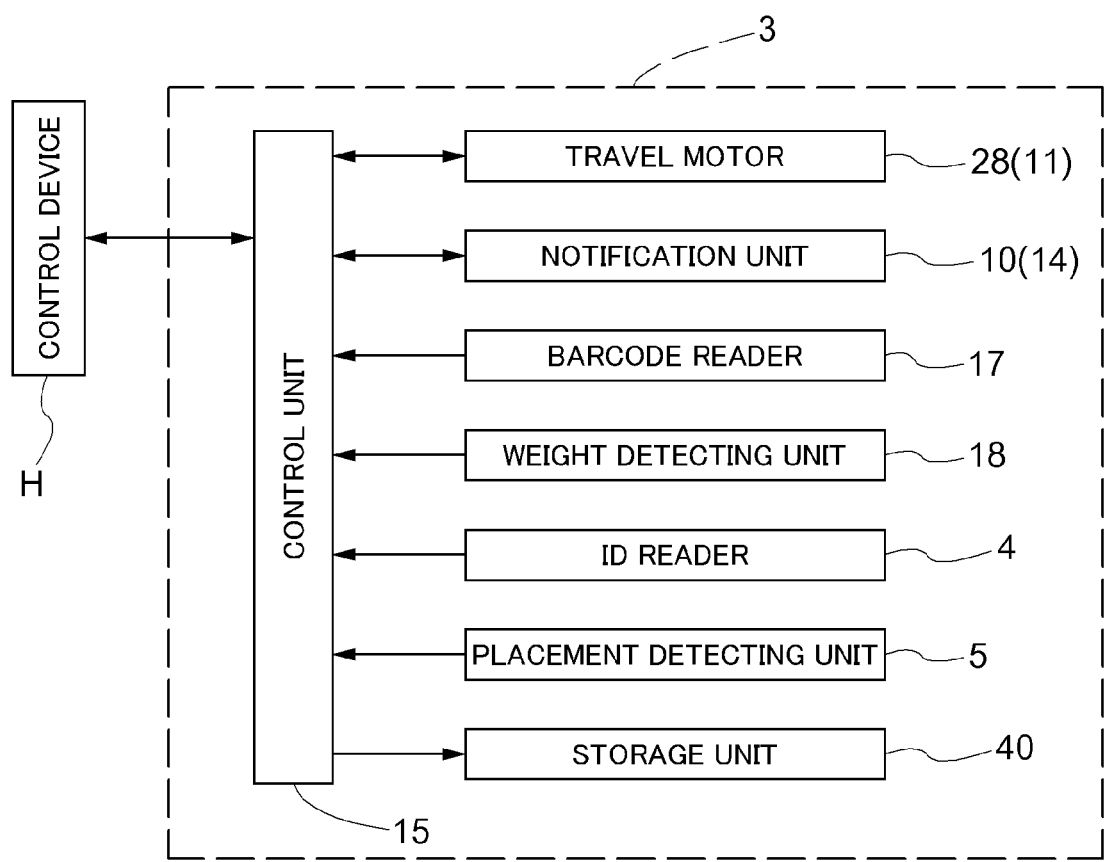
FIG. 6 is a control block diagram.

Note that in the embodiment illustrated in FIG. 6, the storage unit 40 is installed in the article transport vehicle 3. However, the storage unit 40 may be provided in a unit external to the article transport vehicle 3 (a higher-level controller such as the control device H, a server, a database, or the like). In this case, information is transferred via communication from the article transport vehicle 3 to the external storage unit 40. The communication is preferably wireless communication. However, information may be transferred to the external storage unit 40 by information being temporarily stored in a temporary storage medium provided in the article transport vehicle 3 and the external storage unit 40 and the article transport vehicle 3 being connected via a wired connection. Also, this is not limited to a wired connection, and information may be transferred via a temporary storage medium in the case of the temporary storage medium being a memory card or other medium easily detachable from the article transport vehicle 3.

Also, as described above, the support portion 12 is provided with the plurality of support positions Q, and the placement opening K includes the plurality of placement regions R corresponding to the plurality of support positions Q. The placement detecting unit 5 identifies an article placement region BR (see FIG. 10), which is one of the placement regions R through which the article B has been placed. For example, in the embodiment illustrated in FIG. 4, the placement detecting unit 5 includes a plurality of detection devices 51 for each placement region R, or, in other words, corresponding to the first placement region R1, the second placement region R2, and the third placement region R3. Because each placement region R is detected by one of the independent detection devices 51, the article placement region BR can be appropriately identified even if there are a plurality of placement regions.

Also, in another embodiment illustrated in FIG. 8, the placement detecting unit 5 includes a single detection device 51 for all of the placement regions R. In this embodiment, the detection device 51 identifies the article placement region BR on the basis of the relative position between the detection device 51 and the article B when the article B is detected by the detection device 51. For example, in the embodiment illustrated in FIG. 8, the detection device 51 identifies which from among the first placement region R1, the second placement region R2, and the third placement region R3 is the article placement region BR on the basis of the relative position between the detection device 51 aligned in the vertical direction Z and the article B or the worker M.

Figure 9:
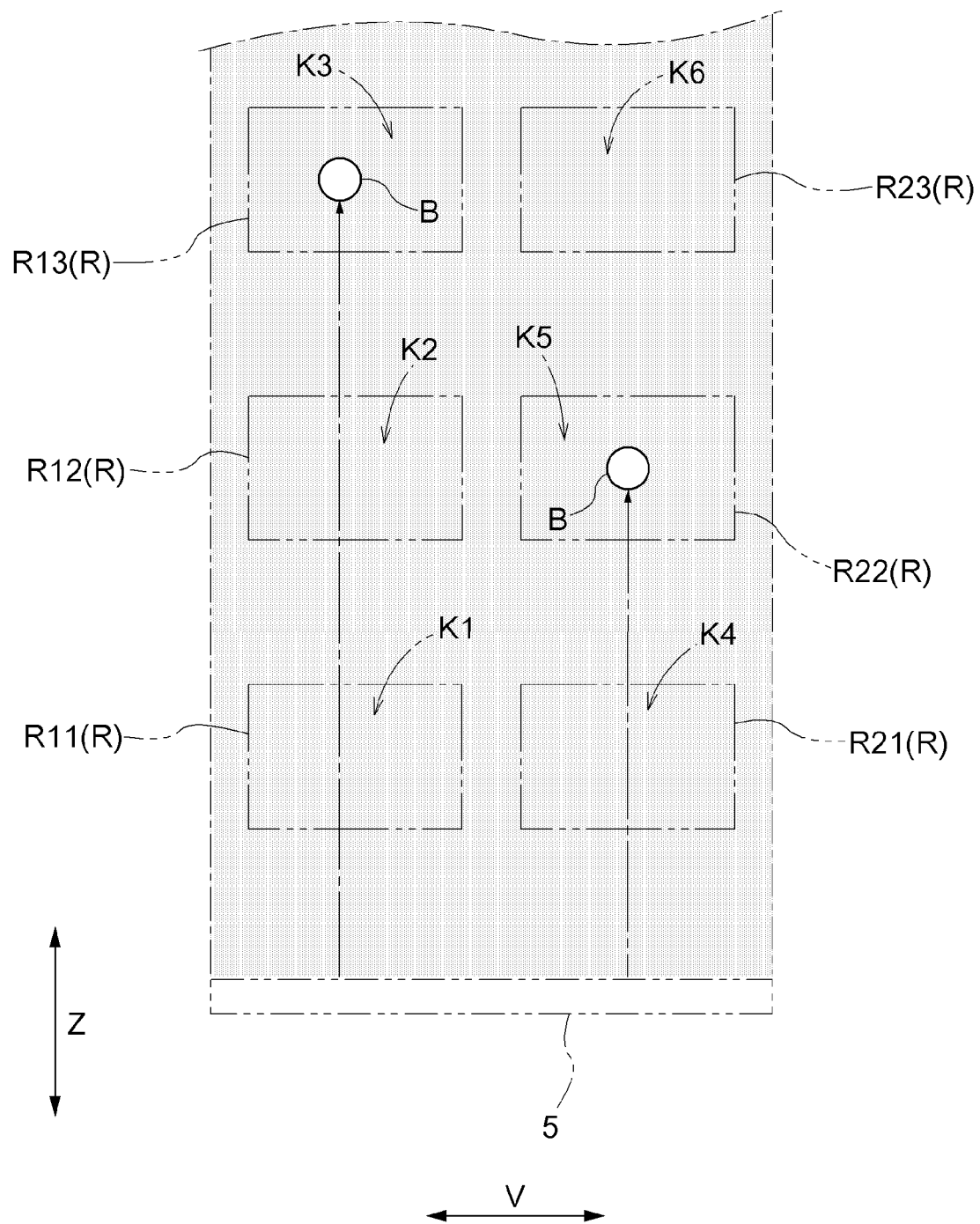
FIG. 9 is a diagram illustrating an example of a method of identifying an article placement region.

FIG. 8 illustrates an embodiment in which the placement regions R set at different positions in the vertical direction Z corresponding to the transport containers 33 at the different support positions Q in the vertical direction Z are identified. However, the article transport vehicle 3 is not limited to an embodiment in which the plurality of transport containers 33 are disposed side by side in the vertical direction Z. In another embodiment, the transport containers 33 may be disposed side by side in the width direction V. FIG. 9 illustrates an embodiment in which the transport containers 33 are arranged in three rows in the vertical direction Z and two columns in the width direction V and illustrates the relationship between the plurality of placement regions R of the article transport vehicle 3 including six placement openings K, indicated by K1 to K6, and the detection range (hatched portion) of the placement detecting unit 5. In the embodiment illustrated in FIG. 9, which one from among the six placement regions R, i.e., a first column first placement region R11, a first column second placement region R12, first column third placement region R13, second column first placement region R21, second column second placement region R22, second column third placement region R23, is the article placement region BR is identified on the basis of the relative position between a single detection device 51 and the article B when the article B is detected by the detection device 51.

As illustrated in FIG. 9, in the case in which the article B is placed through the placement opening K at the position indicated as "K3", the article placement region BR is identified as the first column third placement region R13 on the basis of the relative position between the article B and the detection device 51. Also, as illustrated in FIG. 9, in the case in which the article B is placed through the placement opening K at the position indicated as "K5", the article placement region BR is identified as the second column second placement region R22 on the basis of the relative position between the article B and the detection device 51.

The picking process will be described below with reference to the flowchart of FIG. 10. The control unit 15 of the article transport vehicle 3 controls and drives the travel motor 28 when picking information is received from the control device H and makes the travel portion 11 travel to a set position P set corresponding to the plurality of storage portions 1 that store the articles B. The control unit 15 makes the article transport vehicle 3 travel to the set position P autonomously while avoiding obstacles, such as the article storage shelf 2, the workers M, and other article transport vehicles 3, on the basis of the detection result of a sensor or the like (not illustrated) installed on the article transport vehicle 3. When the article transport vehicle 3 stops at the set position P, the worker M in charge of the area E including the set position P approaches the article transport vehicle 3 and checks the picking information PI displayed on the display unit 14. Information not displayed on the display unit 14 may be included in the picking information PI, however the worker M is at least notified of the information indicative of the target article, i.e., the article to be taken out from the storage portion 1 at the set position P, via the display unit 14.

For example, the column number and row number of the storage portion 1 that is the target storage portion to take out the target article is displayed is displayed on the display unit 14. Also, the support portion 12 of the article transport vehicle 3 is provided with three transport containers 33. Thus, for example, number from the top of the transport container 33 that is the target support position, i.e., the sorting destination support position Q, is displayed. Furthermore, the name or product code of the target article, the number to be taken over, and the like are preferably displayed.

The worker M takes the article B out from the storage portion 1 on the basis of the picking information PI displayed on the display unit 14 and places the article B on the transport container 33 at the target support position. At this time, as described above, the placement detecting unit 5 detects the placement of the article B through the placement opening K and identifies the article placement region BR. Then the ID reader 4 reads the information of the identification information carrier T attached to the worker M. Next, when the worker M touches the, for example, "complete" touch button displayed on the touch panel of the display unit 14, the control unit 15 determines that the placement of the article B on the support portion 12 is complete. Note that when the article B is newly placed on the support portion 12 and the worker identification information MID is read, the "complete" touch button of the touch panel is preferably operable. Of course, the placement of the article B on the support portion 12 may be determined to be complete without the worker M operating a touch button by detecting the placement through the placement opening K.

As illustrated in FIG. 10, first, the control unit 15 receives the picking information PI from the control device H (step S1). As described above, when the control unit 15 receives the picking information PI in step S1, the control unit 15 controls the travel portion 11 to move the article transport vehicle 3 to the set position P. Herein, the process relating to the movement of the article transport vehicle 3 will be omitted, and the step executed after the article transport vehicle 3 arrives at the set position P will be described (in particular the process after step S3, also step S2 may be executed during movement). Also, the worker M operating the "complete" touch button will be omitted herein. When the control unit 15 receives the picking information PI, the control unit 15 makes the display unit 14 output image information GI based on the picking information PI and display at least a piece of the picking information PI as described above (step S2).

The worker M in charge of picking references the display unit 14 and takes out the target article, i.e., the designated article B, from the storage portion 1 and moves the barcode displayed on the target article close to the barcode reader 17 so that the barcode is read. The control unit 15 acquires the article identification information TBID of the target article from the barcode reader 17 (step S3). Note that the article identification information TBID may not be information read by the barcode reader 17 and may be information included in the picking information PI. In this case, the barcode reader 17, i.e., the article identification information reading unit, may not be provided on the article transport vehicle 3. Also, step S3 described above may not be executed.

Next, the control unit 15 waits until the placement detecting unit 5 detects the placement of the article B through the placement opening K (step S4). In step S4, when the placement of the article B through the placement opening K is detected, the process continues to the next step. As described above, in the case in which the support portion 12 includes the plurality of support positions Q and there are the plurality of placement regions R, the article placement region BR is identified and the information is acquired as necessary (step S5). As described above, the worker identification information MID is acquired concurrent with the detection of the placement of the article B through the placement opening K (step S6). The control unit 15 associates the worker identification information MID to placement history PH of the article B and stores the placement history PH in a storage unit 40 (step S7). The article identification information TBID and the article placement region BR can be included in the placement history PH. Also, because the article B to be picked at the set position P is known to be the target article, in step S7, the set position P and the worker identification information MID may be associated and stored as the placement history PH.

Supplement

A summary of the article transport vehicle described above will be described simply below.

An article transport vehicle according to one aspect includes:
- a travel portion that travels to set positions set corresponding to a plurality of storage portions for storing articles;
- a control unit that controls the travel portion;
- a support portion that supports an article taken out from one of the plurality of storage portions and placed through a placement opening by a worker;
- a placement detecting unit that detects placement of an article through the placement opening; and
- an identification information reading unit that reads identification information indicative of information of the worker, wherein
the identification information reading unit reads the identification information when the placement detecting unit detects placement of an article, and
the control unit further associates the identification information and placement history of an article and stores the placement history in a storage unit.

According to this configuration, when the placement detecting unit detects placement of an article through the placement opening, the identification information reading unit reads the identification information indicative of the information of the worker. Thus, the worker does not have to performing any special operations or task to have the identification information read, helping prevent a decrease in work efficiency. Also, the placement history of an article is associated with the identification information and stored in the storage unit. Thus, the worker who took out an article from a storage portion and placed it through the placement opening can be appropriately recorded. In this way, this configuration can, without increasing work, appropriately identify a worker who took an article out from a storage portion when retrieving articles from a plurality of storage portions for storing articles using an article transport vehicle.

Preferably, the support portion includes a plurality of support positions,
the placement opening includes a plurality of placement regions corresponding to the plurality of support positions,
the placement detecting unit identifies an article placement region, which is one of the plurality of placement regions where an article has been placed, and
the control unit associates information of one of the plurality of support positions corresponding to the article placement region and the placement history and stores the placement history in the storage unit.

According to this configuration, in the case in which the plurality of support positions are provided for retrieving articles corresponding to a plurality of sorting destinations, the placement history corresponding each support position can be stored.

Also, in the case in which the placement detecting unit identifies the article placement region from the plurality of placement regions, in one aspect, preferably, the placement detecting unit includes the plurality of detection devices corresponding to the plurality of placement regions.

By the detection devices being provided corresponding to the plurality of placement regions in this manner, placement of the article in the placement regions can be accurately detected.

Alternatively, in the case in which the placement detecting unit identifies the article placement region from the plurality of placement regions, in one aspect, preferably, the placement detecting unit includes a single detection device for all of the plurality of placement regions, and the detection device identifies the article placement region on the basis of a relative position between the detection device and an article when the detection device detects the article.

According to this configuration, the article placement region is detected from all of the placement regions by a single detection device, preventing an increase in the scale of the system.

DESCRIPTION OF REFERENCE SIGNS

1: Storage portion
3: Article transport vehicle
4: ID reader (identification information reading unit)
5: Placement detecting unit
7: Storage container (storage portion)
11: Travel portion
12: Support portion
15: Control unit
40: Storage unit 51: Detection device
B: Article
BR: Article placement region
K: Placement opening
M: Worker
MID: Worker identification information (identification information indicative of information of worker)
P: Set position
PH: Placement history
Q: Support position
R: Placement region

The invention claimed is:

1. An article transport vehicle, comprising:
a travel portion that travels to set positions set corresponding to a plurality of storage portions for storing articles;
a control unit that controls the travel portion;
a support portion that supports an article taken out from one of the plurality of storage portions and placed through a placement opening by a worker;
a placement detecting unit that is supported by the travel portion and detects placement of an article through the placement opening; and
an identification information reading unit that is supported by the travel portion and reads identification information indicative of information of the worker,
wherein the identification information reading unit reads the identification information when the placement detecting unit detects placement of an article, and
wherein in response to the identification information reading unit reading the identification information, the control unit further associates the identification information and placement history of an article and stores the placement history in a storage unit.

2. The article transport vehicle according to claim 1, wherein:
the support portion includes a plurality of support positions,
the placement opening includes a plurality of placement regions corresponding to the plurality of support positions,
the placement detecting unit identifies an article placement region, which is one of the plurality of placement regions where an article has been placed, and
the control unit associates information of one of the plurality of support positions corresponding to the article placement region and the placement history and stores the placement history in the storage unit.

3. The article transport vehicle according to claim 2, wherein the placement detecting unit includes a plurality of detection devices corresponding to the plurality of placement regions.

4. The article transport vehicle according to claim 2, wherein the placement detecting unit includes a single detection device for all of the plurality of placement regions, and wherein the detection device identifies the article placement region on the basis of a relative position between the detection device and an article when the detection device detects the article.

5. The article transport vehicle according to claim 1, wherein the identification information reading unit reads the identification information of the worker on a side of the support portion having the placement opening.

6. The article transport vehicle according to claim 1, wherein the placement detecting unit includes a light curtain that projects light beams and detects the placement of the article through the placement opening, based on blocking of the light beams.

* * * * *